Dec. 1, 1959 G. H. BARRY 2,915,633
PHASE-PULSE GENERATOR
Filed Dec. 5, 1956 8 Sheets-Sheet 1

INVENTOR.
GEORGE H. BARRY
BY
Moody and Goldman
ATTORNEYS

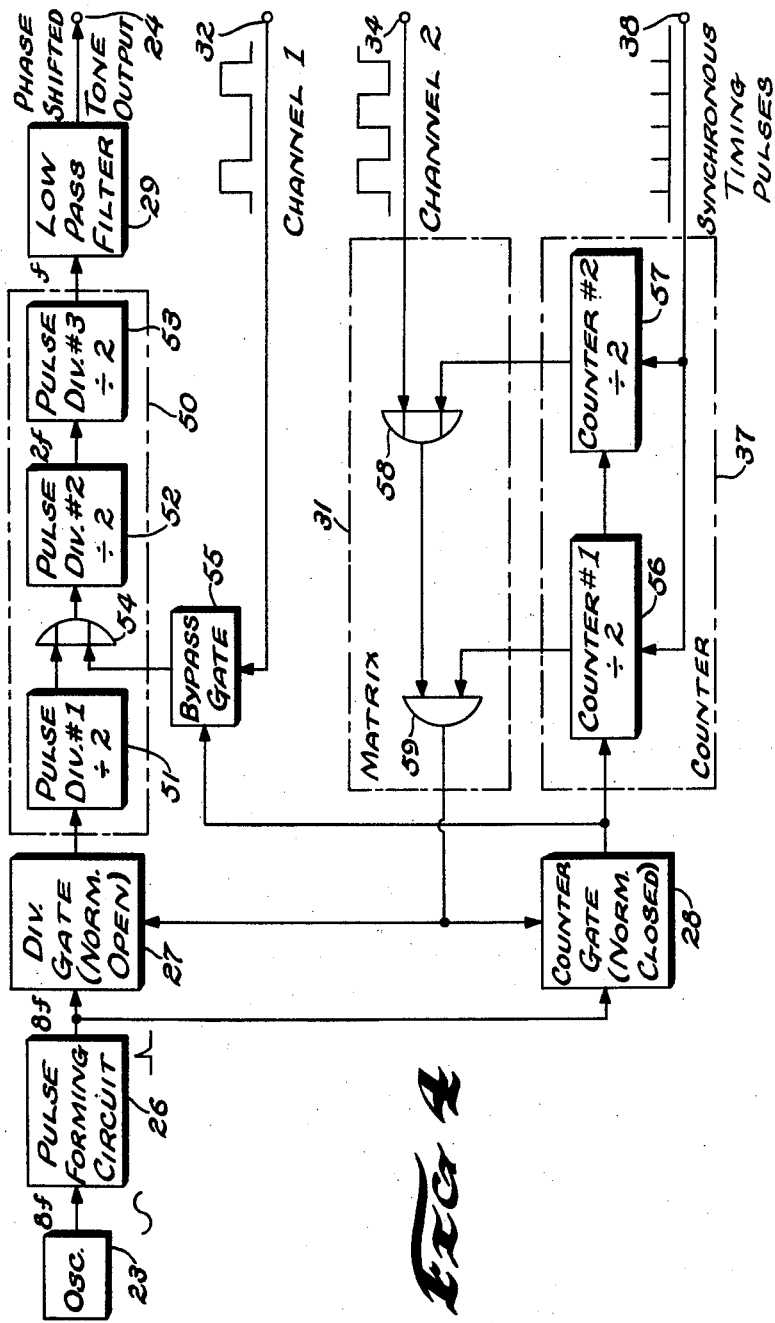

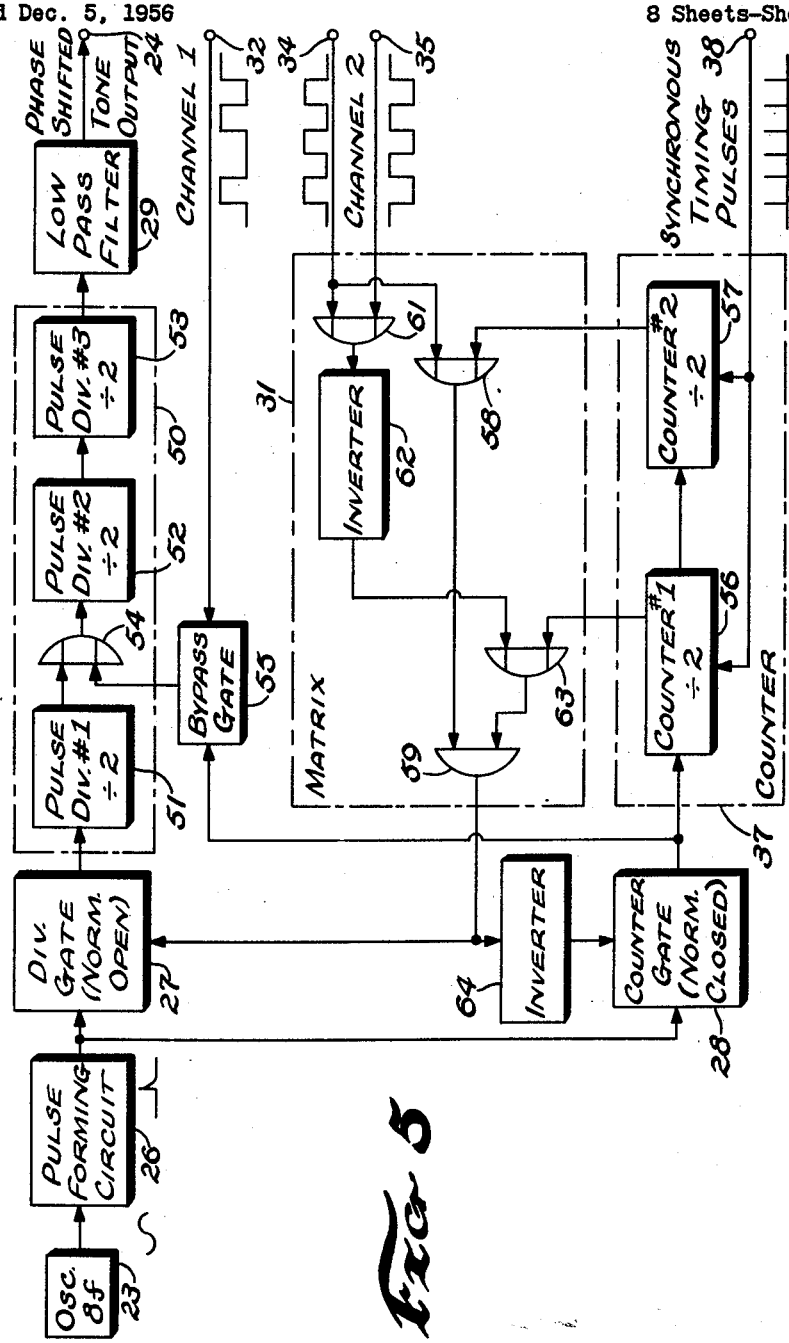

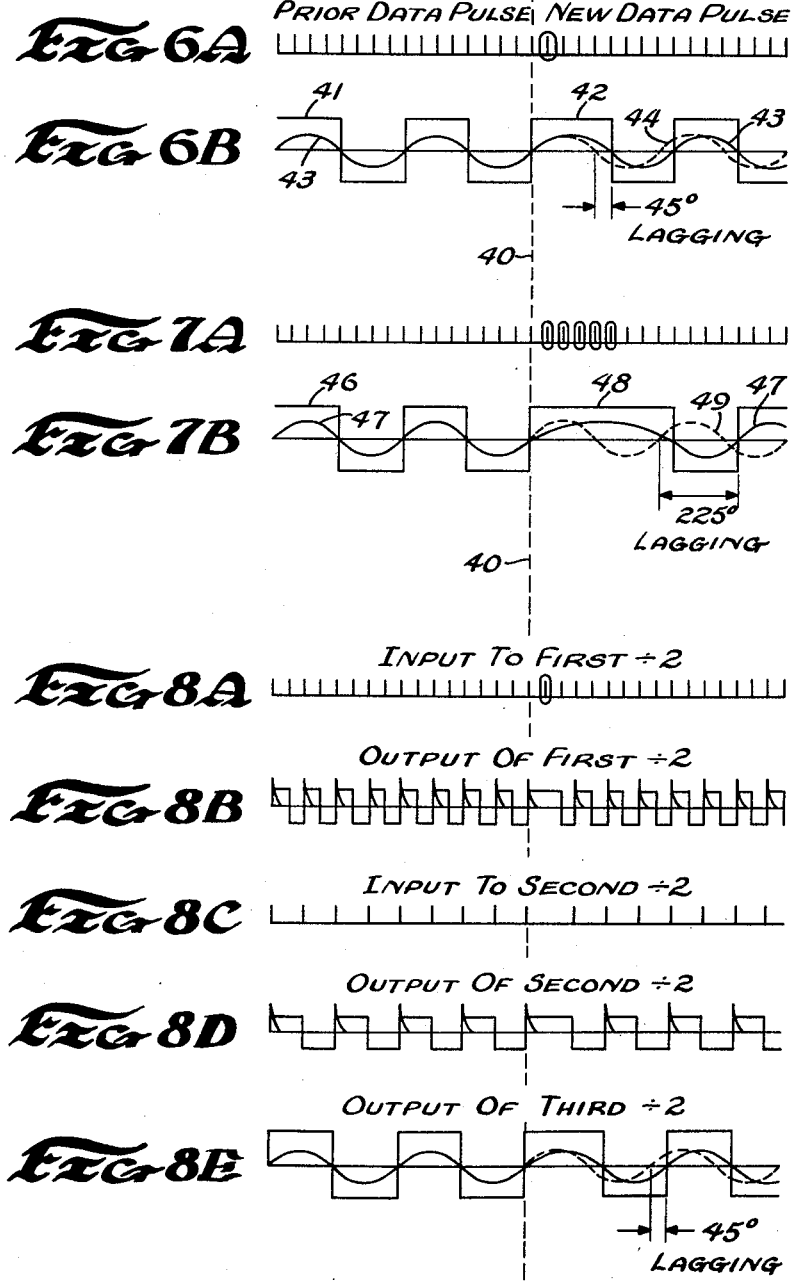

Dec. 1, 1959  G. H. BARRY  2,915,633
PHASE-PULSE GENERATOR
Filed Dec. 5, 1956  8 Sheets-Sheet 6
PRIOR DATA PULSE | NEW DATA PULSE
Fig. 9A  INPUT TO FIRST ÷ 2
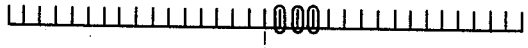
Fig. 9B  OUTPUT OF FIRST ÷ 2
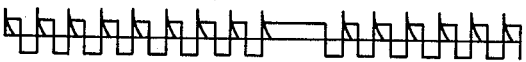
Fig. 9C  INPUT TO SECOND ÷ 2
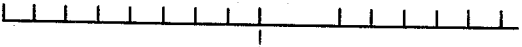
Fig. 9D  OUTPUT OF SECOND ÷ 2
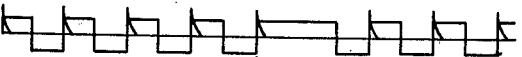
Fig. 9E  OUTPUT OF THIRD ÷ 2
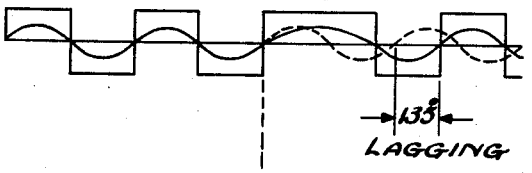
135° LAGGING
INVENTOR.
GEORGE H. BARRY
BY Moody and Goldman
ATTORNEYS

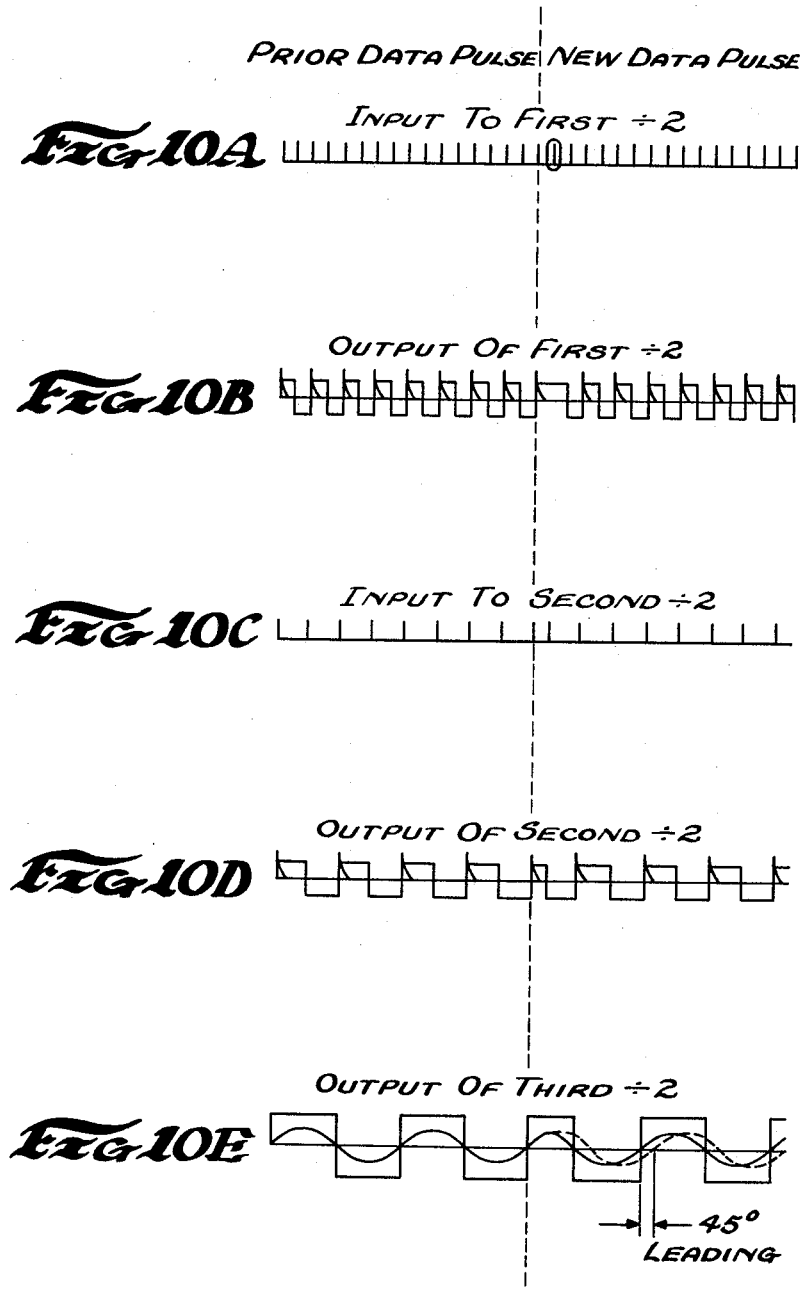

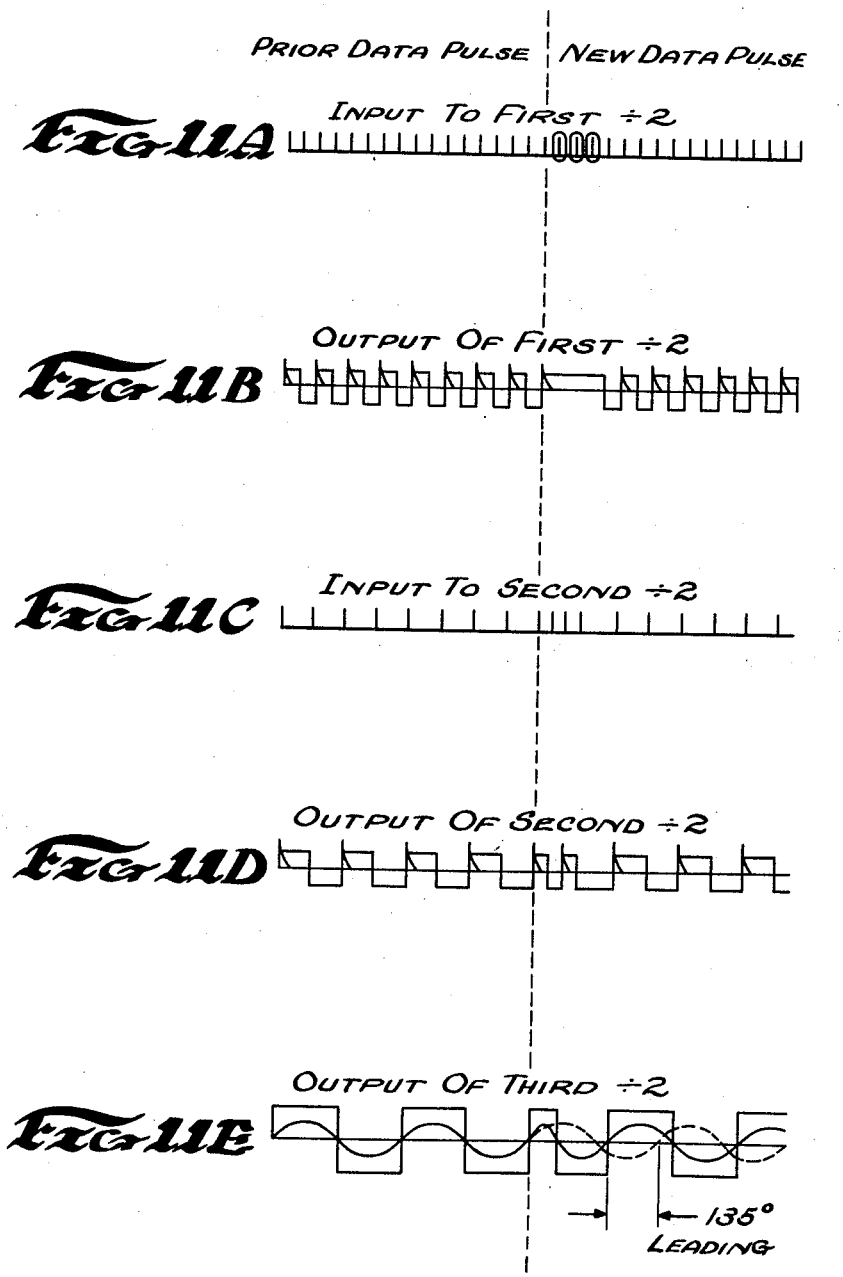

United States Patent Office 2,915,633
Patented Dec. 1, 1959

2,915,633

PHASE-PULSE GENERATOR

George Hamilton Barry, North Hollywood, Calif., assignor to Collins Radio Company, Cedar Rapids, Iowa, a corporation of Iowa Application December 5, 1956, Serial No. 626,493

26 Claims. (Cl. 250—27)

This invention relates generally to means for translating binary information into incremental phase variations of a carrier or subcarrier frequency; which, for example, may be used to transmit a teletypewriter signal or sampled bits of a continuously varying signal.

This invention utilizes a system of transmission taught in Patent No. 2,676,245 to Melvin L. Doelz titled "Polar Communication System" and issued April 20, 1954. Briefly, the system utilizes a predetermined phase change between adjacent tone pulses to recognize a mark or space of a binary code. Thus, the system detects a mark or space by a phase comparison of two adjacent pulses, wherein each pulse acts as a phase reference for its immediately following pulse. Therefore, the system does not require any absolute phase reference and, hence, is not appreciably susceptible to unpredictable phase shifts caused by unknown delays in the propagation of a radio signal.

Furthermore, such system is particularly adaptable for the transmission of two independent channels on a single frequency. This is done by providing one of four phase conditions for each new tone pulse with respect to the prior tone pulse; wherein the signal components of one channel are preferably in quadrature phase with the signal components of the other channel.

However, more than two binary channels can be transmitted simultaneously on a single frequency by providing a plurality of possible phase conditions between adjacent pulses, wherein the plurality is equal to $2n$ the number $(n)$ of channels. Generally, increasing the number of channels in this manner decreases the bandwidth-per-channel but also decreases the signal-to-noise ratio of each channel.

A different means for transmitting information according to this communication system is described and claimed in patent application, Serial No. 502,045, of Melvin L. Doelz titled "High Speed Transmission of Printed Messages," filed April 18, 1955. It recirculates a tone between two magnetostrictive resonator integrators with two data-signal controlled phase shifters connected respectively between them. The phase-modulated output is taken from gates connected to the respective resonators.

The present invention provides a uniquely different means for generating tone pulses that are adjacently phase modulated. The following objects recite many advantages of the present invention over prior means for generating a like output signal.

It is an object of this invention to provide a phase-pulse tone generator which has an output phase accuracy that is as accurate as required without adjustment of any kind.

It is another object of this invention to provide a phase-pulse tone generator that has its output phase uneffected by variations in temperature and supply voltage.

It is still another object of this invention to provide a phase-pulse tone generator which has an output amplitude that is stable and independent of the phase-shift generated.

It is a further object of this invention to provide a phase-pulse tone generator that does not require precision components beyond those required to control the frequency of the tone.

It is a still further object of this invention to provide a phase-pulse tone generator that requires only a single-timing input for dual-channel operation, wherein the timing input is common to the data sources.

It is also an object of this invention to provide a phase-pulse tone generator that permits high data-input impedances, which allow simultaneous monitoring of the data while having data-input signals with low power.

It is another object of this invention to provide a phase-shift tone generator that does not require magnetostrictive components.

It is a further object of this invention to provide a phase-shift tone generator that is smaller, lighter and consumes less power than prior phase-pulse generators.

It is another object of this invention to provide a phase-pulse generating system, which, without change, is adaptable to either single or dual channel operation, while allowing a theoretical 3 decibel improvement in the detection of a single-channel transmission over the detection of either channel in the dual-channel type of transmission.

The invention uses a prime-frequency source. Means for dividing the prime frequency obtains the tone output frequency. Accordingly, each cycle of prime frequency occurs during a fractional portion (a predetermined number of degrees) of a cycle of output frequency. Means is provided for deleting and/or adding cycles of prime frequency to the divider. The deletion of each cycle of prime frequency causes the phase of the tone frequency occurring after the deletion to lag the tone frequency occurring before the deletion by the predetermined number of degrees. On the other hand, the addition of each cycle of prime frequency causes the phase of the tone frequency occurring after the addition to phase lead the tone frequency occurring before the addition by the predetermined number of degrees. The system illustrated in this specification uses 45 degrees as this predetermined number in a dual-channel system.

The invention also teaches how "effective addition," rather than actual addition, of cycles of prime frequency can be done to obtain phase leads by using a chain of dividers and by by-passing certain of the initial dividers. The invention also includes counter and matrix circuits that compute the number of cycles deleted or effectively added. The matrix circuit is directly controlled by one data channel, and the by-pass circuit is controlled by another data channel. Optimum single-channel operation is directly obtainable by disconnecting the data input to the matrix circuit.

Division, deletion and/or addition of cycles is most conveniently done in the described embodiments of the invention by an intermediate conversion of the prime frequency to pulses, so that these operations can be conveniently done by pulse gates. In this situation, the tone output frequency is obtained by filtering the fundamental frequency of the divided-pulsed output.

Further objects, features and advantages of this invention will be apparent to a person skilled in the art upon further study of the specification and drawings, in which:

Figure 4 shows a more detailed form of the invention;

Figure 5 is another form of the invention; and,

Figures 6 through 11 illustrate wave forms used in explaining the operation of the invention.

Figure 2:
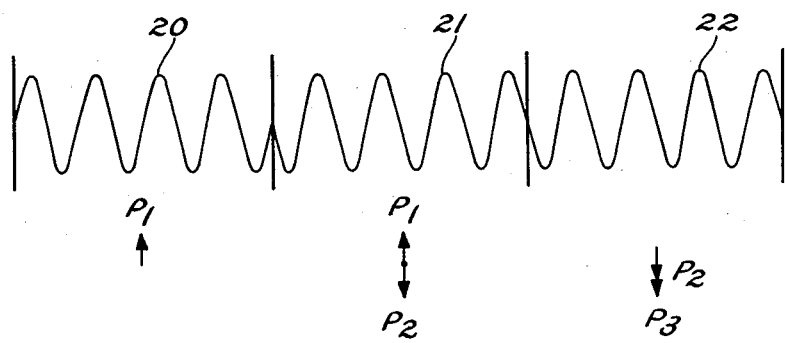
Figure 2 illustrates a wave-form sequence of single-channel output pulses and their vector relationships.

Figure 2 shows a single-channel sequence of three phase-pulses, wherein binary information is provided by the phase between adjacent pulses, as taught in Patent No. 2,676,245, cited above. Opposite types of binary information are represented either by an in-phase or out-of-phase condition between adjacent pulses. The phase of a first pulse 20 is arbitrarily represented by a vector $P_1$, and the phase of a second pulse 21 is represented by another vestor $P_2$ which is 180-degrees opposite from $P_1$. The phase of a third pulse 22 is represented by a third vestor $P_3$ which is in phase with vestor $P_2$. The phase relationship of 180 degrees between adjacent pulses 20 and 21 may be considered one bit of binary information; and the second in-phase relationship between adjacent pulses 21 and 22 represents another bit of binary information of the opposite type. Thus, one may represent a mark and the other a space.

Figure 1:
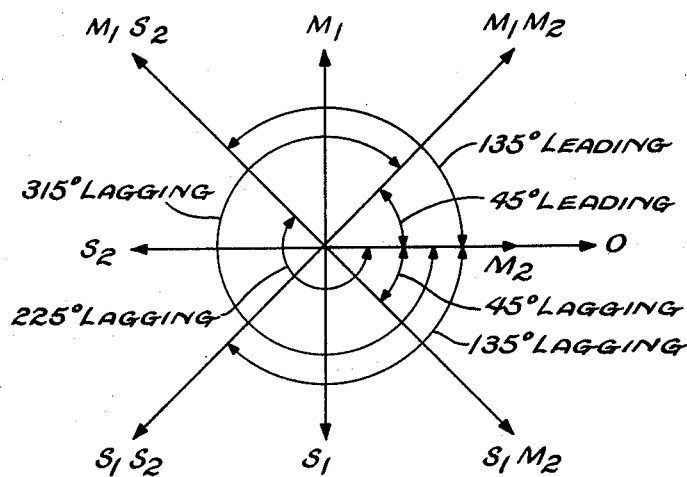
Figure 1 is a vector diagram illustrating the various phase relationships between adjacent tone output pulses of the invention.

However, a sequence of phase-pulses can also accommodate two independent channels of binary information. Figure 1 illustrates the four optimum phase relationships between adjacent output pulses, in which the phase of each pulse represents two independent channels of binary information. In Figure 1, vector O is arbitrarily designated as the phase of an adjacent preceding tone pulse. One channel of information is provided by the next tone pulse having a component either in-phase or 180 degrees out-of-phase with the preceding reference pulse. Vectors $M_2$ and $S_2$ provide these component conditions, where M represents a data mark and S a data space. Similarly, a second channel of information is provided by the pulse having a component either plus-or-minus 90 degrees from the prior reference tone pulse. Vectors $M_1$ and $S_1$ provide the latter component conditions. Since only two component vectors can exist at one time for the two channels, they can be combined in four ways; which are shown as vectors $S_1M_2$, $S_1S_2$, $M_1S_2$ and $M_1M_2$, each representing either a mark or space for both channels. These vectors are odd integer multiples of 45 degrees with respect to the prior reference vector. They represent the gamut of optimum dual-channel phase conditions between adjacent tone pulses provided by this invention. Each of the dual-channel signals can be separately detected as explained in patent application Serial No. 502,045.

Thus, a generator of phase-pulse information must be capable of shifting the phase of its output tone frequency with respect to the phase of the preceding pulse by odd integer values of 45 degrees in response to dual channel data. For example, if in the first channel there is a sequence of mark-space-mark-space, and if in the second channel there is a sequence of mark-space-space-mark, their dual-channel output pulses are vectorially represented by vectors $M_1M_2$, $S_1S_2$, $M_1S_2$ and $S_1M_2$, with vector O representing the phase of the immediately preceding vector for each vector determination.

Accordingly, a system for transmitting this type of pulse information must provide an incremental phase variation between adjacent pulses, of one of the following values: 45 degrees, 135 degrees, 225 degrees or 315 degrees, either leading or lagging.

It may be noted that reference vector O shifts each time in its absolute position. Thus, if a series of marks are provided in both channels, reference vector O shifts by an absolute increment of 45 degrees leading for each pulse in the sequence.

Figure 3:
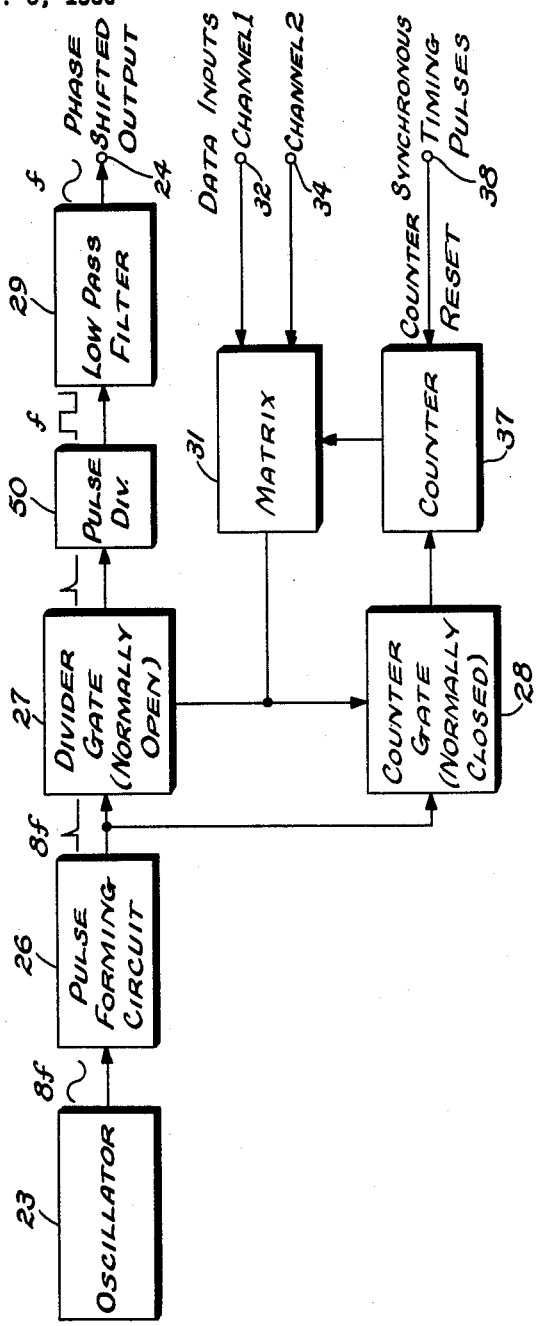
Figure 3 illustrates a form of the invention.

Figure 3 illustrates a phase-pulse generating means made according to this invention. It receives two independent channels of amplitude-switched binary data at terminals 32 and 34. Each channel provides its data by switching between voltage levels $a$ and $b$, which may be either positive or negative. The data amplitude pulses of each channel are syncronized with a timing-pulse source connected to terminal 38. Each timing pulse occurs at the initiation of each each data pulse.

A prime frequency for the system is provided by an oscillator 23 (or an external source) and is eight times the tone output frequency provided at output terminal 24. Thus, if the tone output frequency is one kilocycle-per-second, the oscillator frequency will be eight kilocycles-per-second.

A pulse-forming circuit 26 is connected to the output of oscillator 23 and provides a positive pulse for each prime-frequency cycle. Such pulses are designated as oscillator pulses. A divider gate 27 and a counter gate 28 have their inputs connected to the output of pulse-forming circuit 26. A pulse-repetition-rate divider 50 is connected to the output of divider gate 27 to provide one output-pulse cycle for eight-received pulses. Divider 50, for example, may be comprised of three flip-flop circuits connected in tandem.

A low-pass filter 29 is connected between the output of divider 50 and output terminal 24 to pass the fundamental frequency of the pulsed output from the divider 50. This obtains a single frequency output of the invention.

Phase-shifting of the output frequency is accomplished in Figure 3 by deletion of certain pulses from the output sequence of pulse-forming circuit 26. Normally-open divider gate 27 does the deleting by being closed for a number of oscillator pulses, as determined by a computing means portion of the invention explained below.

For each oscillator pulse blocked by divider gate 27, the tone output is phase shifted by 45 degrees lagging with respect to the tone output existing immediately before the blocking. Phase-shifting by pulse blocking is illustrated in Figures 6 and 7. Figure 6a shows an oscillator-pulse sequence that represents the output of pulse-forming circuit 26 during adjacent parts of a prior data pulse and a new data pulse. Line 40 separates the data pulses and represents the instant of a timing pulse, which occurs upon the initiation of each new data pulse.

In Figure 6a, a single oscillator pulse (which is encircled) is deleted at the input to divider 50, which provides an output square-wave cycle for eight received-oscillator pulses. Thus, half-cycle reversals occur at the output of divider 50 on the fifth of a received-sequence of pulses. Square-wave 41 is, therefore, provided at the divider output. A transient square-wave half-cycle 42 occurs at the instant of the pulse deletion and is extended for the period of an additional pulse interval, since it must do so before it can be reversed on the fifth received pulse. The square-wave output of the new data pulse returns to a steady-state value after pulse 42, but is phase shifted by one oscillator-pulse interval, with respect to the prior square wave. Wave 43 (shown in solid lines) represents the tone output of low-pass filter 29, which removes the harmonic content of the square wave. The 45 degree lagging phase relationship between the steady-state tone waves during the prior and new data pulses is illustrated by extending the steady-state prior data wave with dotted line 44. It is, therefore, seen that new tone wave 43 lags the prior tone wave 43 by 45 degrees, which corresponds to the period of one deleted pulse.

Figure 7 gives another example, wherein the five encircled oscillator pulses are deleted at the beginning of a new data pulse. Thus, the output from divider 50 is represented by square wave 46 in Figure 7B, and the solid-line wave 47 represents the tone output. The transition portion is pulse 48 which is extended for the periods of five additional oscillator pulses, because it reverses on its fifth received pulse. After extending the steady-state prior data-pulse wave by dotted line 49, it is apparent that the steady-state new data pulse tone wave lags the steady-state prior data pulse tone wave by 225 degrees. Similar analyses can be provided for any number of deleted pulses to prove that a phase lag of 45 degrees occurs for the new tone wave for each oscillator pulse blocked by divider gate 27.

The data input in Figure 3 controls the number of pulses deleted according to the dual-channel code:

| Combination Vector | Lagging Phase-Shift, degrees | Pulses Deleted |
|---|---|---|
| $S_1M_2$ | 45 | 1 |
| $S_1S_2$ | 135 | 3 |
| $M_1S_2$ | 225 | 5 |
| $M_1M_2$ | 315 | 7 |

The automatic deletion of pulses in Figure 3 in response to input data is accomplished as follows: The data inputs from channels one and two are provided to a matrix 31 at terminals 32 and 34, respectively. A counter 37 has one input connected to the output of counter gate 28. Counter 37 has another input connected to terminal 38 to receive the synchronous timing pulses. Each timing pulse resets counter 37 to its first count. The output of counter 37 is provided to matrix 31.

The output of matrix 31 is connected to the control input of divider gate 27 and counter gate 28 to control whether the gates pass or block pulses received at their inputs. The normal matrix output voltage is assumed for purposes of explanation to be at level $b$, which maintains divider gate 27 normally open to permit the pulses to pass from pulse-forming circuit 26 to divider 28. On the other hand, level $b$ maintains counter gate 28 normally closed to prevent the pulses of circuit 26 from reaching counter 37.

Matrix 31 and counter 37 comprise a computer means that causes matrix 31 to normally provide output voltage $b$. But upon the reset of counter 37 by a timing pulse, the matrix output voltage is inverted to its other level $a$ which closes divider gate 27 and opens counter gate 28. This inhibits pulses from reaching divider 28 but allows pulses to reach counter 37. Inverted matrix output $a$ remains until a given number of pulses are counted by counter 37 to inhibit either 1, 3, 5 or 7 pulses, according to whether a phase shift of 45, 135, 225 or 315 degrees is required for the new output tone. Upon receiving the last required counter pulse, the matrix output reverts to its normal state $b$, until the next synchronous timing pulse is received to start a new count.

The system described in connection with Figure 3 obtains all of its phase shifts by removing oscillator pulses from the divider input. This causes a transient in one situation that has a duration of ⅞ of a tone output cycle, which occurs for combination data pulse $M_1M_2$.

A system which would add the required number of oscillator pulses to the divider input, rather than block them as in Figure 3, would also obtain the required relative phase shift between adjacent tone pulses. Each added pulse would cause a leading 45 degree phase shift, rather than the lagging phase shift caused by the deletion of pulses. The maximum transient time between adjacent tone pulses is minimized by the system which only adds pulses. Thus, a maximum of seven pulses added between two adjacent oscillator pulses at the input of divider 28 would cause a transient to exist for ⅛ of a tone output cycle. A difficulty here arises in obtaining a pulse divider which can respond sufficiently fast to seven pulses received in this short interval of time, when the oscillator frequency is relatively high.

A compromise situation is provided in Figure 4 where all of the required phase shifts are obtained by deleting pulses for some phase shifts and "effectively adding" pulses for the other phase shifts.

However, in situations where narrow-bandpass filtering or long time-constant circuits are used, the transient time between output tone pulses may be increased over what is designated herein as the transient time.

In Figure 4, an optimum computing situation is also provided because all phase shifts can be obtained with a computing means that recognizes only one and three pulses.

The "effective addition" of pulses is done in a unique manner wherein "addition" is obtained without actually adding or generating any new pulses. This is done by utilizing a chain 50 of three binary pulse dividers 51, 52 and 53. "Effective addition" of a given number of pulses is obtained by by-passing the first binary divider 51 in the chain by the given number of oscillator pulses. "Effective addition" occurs because each by-passed pulse provided to the input of second binary divider 52 acts as though a pair of pulses were provided at the input to first binary divider 51, because the second binary divider receives one pulse for every two received by the first binary divider. Thus, when oscillator pulses are routed around a prior divider, effective addition and a corresponding leading phase shift occurs. This is explained in more detail below.

In the system of Figure 4, chain 50 of binary dividers divides by eight the rate that pulses are received by the chain. Each binary divider can be a bistable circuit such as a conventional flip-flop circuit. An "or" gate 54 connects the input to second divider 52 to the output of first divider 51.

A by-pass gate 55 has its single input connected to the output of counter gate 28 and its output connected to the other input of "or" gate 54. The control input to by-pass gate 55 is connected to terminal 32 to receive the input data from channel one.

As in Figure 3, the output of the matrix circuit 31 in Figure 4 is connected to the control inputs of divider gate 27 and counter gate 28 to maintain them in opposite states. Some gate circuit designs will require a polarity inverter to be interposed between one of these gates and the matrix output to maintain opposite states.

Lagging phases of 45 and 135 degrees are obtained in Figure 4 as previously described by blocking one and three pulses respectively at the input to divider chain 50.

However, leading phases of 45 and 135 degrees are obtained in Figure 4 by by-passing one and three pulses to the input of second binary divider 52.

Accordingly, each of the four combination vectors illustrated in Figure 1 is obtainable in Figure 4 with a computing system that need only count to one and three and operate with these two conditions. Consequently, counter 37 in Figure 4 requires only two binary-counter circuits 56 and 57.

As in Figure 3, Figure 4 utilizes an oscillator 23, a pulse-forming circuit 26, a divider gate 27 and a counter gate 28, which, accordingly, are given the same reference numbers.

Each of the counters 56 and 57 is a bistable device such as a flip-flop circuit. It is assumed that each of the counters provides a single output which has either voltage level $a$ or $b$. Each of the counters have a reset feature (which may be conventional) connected to synchronous timing pulse terminal 38, which receives a timing pulse at the initiation of simultaneous data pulses in both channels. Each timing pulse resets both counter outputs in this example to voltage level $a$.

The input to first counter 56 is connected to the output of counter gate 28.

Matrix 31 in Figure 4 has two gates, one being an "or" circuit 58 and the other being an "and" circuit 59. "Or" gate has one input connected to terminal 34 to receive the data pulses of channel two. The other input to "or" gate 58 is connected to the output of second counter 57. "Or" gate 58 can be a conventional type, wherein it recognizes the binary digits 0 and 1 as voltage levels $a$ and $b$ respectively. The data pulses of each channel are assumed in this example to switch between voltage levels $a$ and $b$. The following chart illustrates the input-output relationships for "or" circuit 58:

CHART I

"Or" circuit

| Input 1 | Input 2 | Output |
|---------|---------|--------|
| a | a | a |
| a | b | b |
| b | a | b |
| b | b | b |

"And" gate 59 has one input connected to the output of "or" gate 58. The other input to "and" circuit 59 is connected to the output of first counter 56. "And" circuit 59 can be conventional, and its input-output relationships are given in the following chart:

CHART II

"And" circuit

| Input 1 | Input 2 | Output |
|---------|---------|--------|
| a | a | a |
| a | b | a |
| b | a | a |
| b | b | b |

The output of matrix 31 is the output of "and" gate 59.

Conventional "and" and "or" circuits which can be used in this invention are found in a book titled, "High-Speed Computing Device" by the staff of Engineering Research Associates, Inc. published by McGraw-Hill Book Company.

The following chart tabulates the operational voltage states of the matrix and counter circuits in response to timing pulses received by counter 37 and channel two data pulses received by matrix 31:

CHART III

| Channel Two Data Pulse Level | Timing or Oscillator Pulse | "Or" Gate ||| Counter #1, Output | Counter #2, Output | "And" Gate |||
|---|---|---|---|---|---|---|---|---|---|
| | | Input #1, Data Pulse Level | Input #2, Counter #2 Output | Output | | | Input #1, "Or" Gate Output | Input #1, Counter #1 Output | Output |
| b (mark) | reset | b | a | b | a | a | b | a | a |
| | 1 | b | a | b | b | a | b | b | b |
| a (space) | reset | a | a | a | a | a | a | a | a |
| | 1 | a | a | a | b | a | a | b | a |
| | 2 | a | b | b | a | b | b | a | a |
| | 3 | a | b | b | b | b | b | b | b |

Chart III is discussed further in explaining the operation of the system of Figure 4.

At the initiation of the data pulses of channels, a timing pulse is received at terminal 38 to reset the outputs of counters 56 and 57 to voltage a. Thus, one input to "and" circuit 59 is reset level a from first counter 56. Accordingly, "and" circuit 59 can only provide output level a upon receiving a timing pulse. As a result, the normal states of divider gate 27 and counter gate 28 are reversed by matrix output state a, which closes divider gate 27 and opens counter gate 28.

In order to provide the lagging phase shifts at output terminal 24 in Figure 4 to provide combination vectors $S_1M_2$ and $S_1S_2$ of Figure 1, it is necessary to block one and three pulses, respectively, at the input to counter chain 50. Furthermore, to provide the remaining combination vectors $M_1M_2$ and $M_1S_2$, it is required in Figure 4 to by-pass one and three pulses, respectively, around first binary divider 51.

It is first explained how the deletion of one and three pulses, respectively, is obtained. In obtaining vectors $S_1M_2$ and $S_1S_2$, channel one is in each case providing a data space-pulse to the control input of by-pass gate 55, and by-pass gate 55 is closed by such input. Accordingly, oscillator pulses cannot be by-passed.

With vector $S_1M_2$, channel two is simultaneously providing a data mark-pulse at voltage level b. Thus, "or" gate 58 receives input level b from data channel two and input level a from second counter 57 to provide an output level b to "and" circuit 59.

The first oscillator pulse occurring after the timing pulse is therefore blocked by divider gate 27, but is passed through counter gate 28 to change the output state of first counter 56 to level b, which inverts input level a to "and" circuit 59 to level b. Since the other input to "and" circuit 59 remains at the same level b because the inputs to "or" circuit 58 remain unchanged, the output of "and" gate 59 reverts to level b; which is the normal state that opens divider gate 27 and closes counter gate 28.

Once the normal state is obtained, no further oscillator pulses can reach the matrix for the remainder of the data pulse, because counter gate 28 is closed. Hence, normal matrix output level b continues until the next timing pulse, which resets the counter outputs to level a to cause the matrix output to invert to level a.

When it is desired to send a space in both channels, the tone pulse phase is given by vector $S_1S_2$ in Figure 1 with respect to the phase of the prior pulse. By-pass circuit 55 remains closed. At the initiation of these data pulses, a synchronous timing pulse is provided at terminal 38 which, as explained above, inverts the matrix output to voltage level a to close divider gate 27 and open counter gate 28. The data space-pulse of channel two has level a, which "or" gate 58 receives as one input, while receiving a second input level a from the reset output of second counter 57 to provide an input level a to "and" gate 59. The first oscillator pulse is blocked by divider gate 27 and is passed by counter gate 28 to first binary counter 56, which inverts its output to voltage b.

Since the inputs to the "or" gate remain unchanged to maintain its output level a, the only change is to "and" gate 58 which has its second input inverted to voltage level b. Thus, the output of "and" gate 59 and matrix 31 remains at voltage level a. Thus, after the first oscillator pulse is received, the divider gate remains closed and the counter gate remains open with data pulses $S_1$ and $S_2$.

Consequently, the second consecutive oscillator pulse is blocked by divider gate 27 and is passed by counter gate 28.

When the second oscillator pulse passes through counter gate 27, the output of first counter 56 reverts to voltage level a, and the output of second counter 57 changes to level b. Thus, "or" gate 58 has one input changed to level b. Then, "or" gate 58 provides an output b which reverses the first input to "and" gate 59. However, the second input to "and" gate 59 is now changed to level a because that is now the output from first counter 56. Hence, "and" gate 59 continues to provide output voltage a.

As a result, the third consecutive oscillator pulse is blocked by divider gate 27 and passed through counter gate 28. This reverses the output state of first counter 56 to level b, while the output state of second counter 57 remains unchanged at level b. Thus, the inputs to "or" gate 58 are unchanged to continue first input b to "and" gate 59. However, the second input to "and" gate 59 is changed to value b, and its output is, therefore, changed to the normal matrix output voltage level b, which opens divider gate 27 and closes counter gate 28. After counter gate 28 is closed, no further input pulses can be received by counter 37 and the output of the matrix circuit in Figure 4 remains unchanged at level b for the remainder of the data input pulse.

Accordingly, three oscillator pulses are blocked while none are passed to cause the 135 degree lagging phase shift required for vector $S_1S_2$. Figures 9A through E illustrate the divider operation that causes this phase change between a prior data tone pulse and a new data tone pulse.

When it is desired to transmit a mark in the first channel and a space in the second channel to provide vector $M_1S_1$ in Figure 1, the new tone pulse must lead the prior tone pulse by 135 degrees. In this case, the data output from channel one is a mark and from channel two is a space. Thus, counter gate 28 passes exactly three oscillator pulses as explained above, because only the input of channel two controls the operation of the matrix circuit, counter gate and divider gate. However, in this case, the mark output of channel one opens by-pass gate 55. Accordingly, the three pulses which are blocked by divider gate 27 are by-passed around first binary divider 51 through counter gate 28, by-pass gate 55, and "or" circuit 54 to second binary counter 52. The operation of the binary pulse dividers during the by-passing of three pulses is illustrated in Figures 11A–E to provide a new steady-state tone pulse that leads the prior tone pulse by 135 degrees as required by vector $S_1M_2$.

When it is required to have a mark in both channels, the phase of the new pulse is given by vector $M_1M_2$ in Figure 1, which is 45 degrees leading with respect to the prior tone pulse.

It is remembered from above that when channel two provides a mark to the matrix, divider gate 27 remains closed and counter gate 28 remains open for one oscillator pulse. It is also remembered that a mark from the first channel opens by-pass gate 55. Hence, in this case, the single pulse passed by counter gate 28 is also passed by by-pass gate 55 and "or" gate 54. The operation of the binary pulse dividers during the by-passing of a single oscillator pulse is illustrated in Figures 10A through E which show that the new tone pulse leads the prior tone pulse by 45 degrees.

It is, therefore, realized how the phase of each new tone pulse at output terminal 24 is phase-shifted by an incremental amount with respect to the prior tone pulse by one of four combination vectors shown in Figure 1, so that a single tone frequency carries the independent data information from channels one and two.

The embodiment illustrated in Figure 5 utilizes the general features found in Figure 4. However, the matrix circuit in Figure 5 is modified to permit either dual-channel operation, as explained for Figure 4, or single channel operation with plus-or-minus 90 degree phase shifts between adjacent tone pulses. This type of single channel operation obtains an effective 3-decibel increase in detectable signal level over either channel in dual-channel operation for the same level of received signal. This can be observed from an inspection of Figure 1, where it is noted that the single channel components of any combination vector are each only 0.707 time its magnitude. This is the detectable amount in each combination pulse for each channel. Accordingly, if the system of Figure 4 is operated with only a single channel, the vectors representing for channel one operation are displaced by plus-or-minus 45 degrees, while the vectors for channel two operation are displaced 45 and 135 degrees, which do not provide anymore detectable magnitude for single-channel operation than for dual-channel operation. It can, therefore, be realized that if during single channel operation the output-tone pulse is phase shifted either plus-or-minus 90 degrees or zero and 180 degrees, the magnitude of the detectable pulse is the entire magnitude of the received pulse. The circuit in Figure 5 obtains a plus-or-minus 90 degree phase shift when only channel one is connected.

The matrix circuit in Figure 5 includes an input "or" circuit 61 having a pair of channel two input terminals 34 and 35. An inverter circuit 62 has its input connected to the output of "or" circuit 61. Another "or" circuit 58, which functions similarly to "or" circuit 58 in Figure 4, has one input connected to terminal 34 and another input connected to the output of second counter 57. A third "or" circuit 63 has one input connected to the output of inverter circuit 62 and another input connected to the output of first counter 56. An "and" circuit 59, which functions similarly to "and" circuit 59 in Figure 4, has one input connected to the output of "or" circuit 58 and another input connected to the output of "or" circuit 63.

The output of "and" circuit 59 is likewise the output of the matrix circuit in Figure 5 and is connected to the control input of divider gate 27. An inverter 64 is connected between the output of matrix 31 and the control input to counter gate 28. Inverter 64 inverts the state of its input voltage a or b to the opposite state b or a, respectively to control counter gate 28 oppositely from divider gate 27.

In Figure 5, channel two input terminal 34 is the same as in Figure 4. Additional terminal 35 also receives the data from channel two, but this data is inverted from that received at terminal 34. That is, when channel two provides level b at terminal 34, it provides level a at terminal 35, and vice versa.

"Or" circuit 61 provides output level b as long as it receives the pair of inverted inputs, because one of them will always be at level b, which is selectively passed by "or" circuit 61. Thus, inverter 62 receives input level b as long as channel two data is received to provide an output voltage a to one input of third gate circuit 63. However, when no data input is provided at terminals 34 and 35 by channel two, the zero output from "or" circuit 61 acts like level a to inverter circuit 62, which then provides an output voltage b to the first input of third "or" gate 63.

When dual-channel data inputs are being provided to the system of Figure 5, it operates in the same manner as the system described above in Figure 4. This is because inverter gate 62 then provides an output level a to one input of "or" circuit 63. Then, "or" circuit 63 provides an output that is solely dependent upon its other input from first counter 56, as if there were a direct connection between counter 56 and one input to "and" gate 59 like in Figure 4. In this situation, the second input to "and" circuit 59 is also the same as occurred in Figure 4, because it is provided by "or" circuit 58 which is connected to terminal 34 and counter 57 as in Figure 4. Consequently, when a signal from channel two is being received in the system of Figure 5, "or" circuit 61, inverter circuit 62, and "or" circuit 63 do not have any operating function. Therefore, the system operates as though they were left out, which is the dual-channel system of Figure 4.

If single-channel operation is required, which has the above-described 3-decibel improvement, it is obtained by only having channel one connected. Thus, channel two is disconnected, and zero voltage occurs at the input to inverter 62 and at one input to "or" circuit 58. Zero voltage appears to these components as voltage level a.

These matrix conditions cause divider gate 27 to block and counter gate 28 to pass two oscillator pulses after each resetting of counter 37 by a timing pulse.

The following chart tabulates the operational voltage states of the matrix and counter circuits in response to timing pulses received by counter 37 with channel two data disconnected from matrix 31 in Figure 5:

CHART IV

| Timing or Oscillator Pulse | "Or" Gate 61 Output, Lockout Gate Input | "Or" Gate 58 | | | "Or" Gate 63 | | | "And" Gate 59 | | |
|---|---|---|---|---|---|---|---|---|---|---|
| | | Input #1 | Input #2, Counter #2 Output | Output | Input #1, Inverter 62 Output | Input #2, Counter #1 Output | Output | Input #1, "Or" Gate 58 Output | Input #2, "Or" Gate 63 Output | Output |
| reset | 0 | 0 | a | a | b | a | b | a | b | a |
| 1 | 0 | 0 | a | a | b | b | b | a | b | a |
| 2 | 0 | 0 | b | b | b | a | b | b | b | b |

The operation of matrix 31 in Figure 5 is now explained for single data-channel operation, wherein only channel one is connected to terminal 32. When a data space-pulse is received, by-pass gate 55 is closed; and when a data mark-pulse is received, gate 55 is open.

Simultaneously, with the reception of data pulses at terminal 32, timing pulses are received at terminal 38 to synchronously reset the counter outputs to levels $a$. Since there is no data input at terminals 34 and 35, inverter circuit 62 provides a continuous output voltage $b$ as one input to third "or" gate 63, which forces third "or" circuit 63 to provide a continuous output level $b$ as one input to "and" circuit 59. The other input to "and" circuit 59 is the output of second counter 57, which is passed through "or" gate 58, because its zero input from terminal 34 makes its output wholly responsive to the input from second counter 57. Consequently, during single-channel operation, the output of matrix 31 is sensitive only to the output of second counter 57, which is reset to level $a$ at the beginning of each data pulse by a timing pulse.

Each timing pulse, therefore, causes the output of second counter 57 to be level $a$, which causes the matrix circuit to provide output level $a$, which closes divider gate 27 and opens counter gate 28.

After a timing pulse, the first oscillator pulse is passed through counter gate 28. It reverses the output state of first counter 56 (which has no effect on the matrix in this case), and it does not change the output of second counter 57, which continues at output level $a$. Accordingly, after the first oscillator pulse, the output of "and" circuit 59 remains at level $a$.

When the second oscillator pulse is received, the output of second counter 57 is inverted to level $b$. This reverts the output of "and" circuit 59 to normal level $b$ which closes counter gate 28 and opens divider gate 27. Consequently, with an input only from channel two, two pulses are blocked by divider gate 27 and passed by counter gate 28.

When a data space-pulse is received at channel-one terminal 32, by-pass gate 55 is closed. Hence, the two pulses blocked by divider gate 27 are not by-passed, and the new tone pulse is phase shifted by 90 degrees lagging from the previous tone pulse.

However, when a data mark-pulse is provided by the first channel, by-pass gate 55 is opened, and the two pulses received at the output of counter gate 28 are by-passed to the input of second divider circuit 52 to provide a new output tone pulse that is phase-shifted by 90 degrees leading with respect to the prior tone pulse.

It is, therefore, realized that the single input from channel one causes a plus-or-minus 90 degree phase change between adjacent pulses rather than the 45 degree variations obtained during dual-channel operation.

When the oscillator pulses occur randomly with respect to the timing pulses, it is possible that they will have time coincidence at certain instances. In these coincidence situations, the oscillator pulse may be received when divider gate 27 is partially closed and counter gate 28 is partially open; in which case the oscillator pulse may pass through both gates with sufficient amplitude to actuate both first divider 51 and first counter 56, or may not have sufficient amplitude to pass through either gate. In this situation, an oscillator pulse will pass through both gates or will not pass through either gate to cause a 45° phase shift for the new tone pulse. Such phase shift is not considered by the computer, which computes properly only when no pulses pass through divider gate 27 and when it is receiving the blocked pulses. Consequently, a new tone pulse following a coincidence situation will have an erroneous phase. As a result, a sequence of output tone pulses may have random errors (which may be relatively few in practice) unless means are provided to prevent possible coincidence between oscillator pulses and timing pulses.

Such coincidence errors can be prevented in several ways. One is to derive the oscillator pulses and timing pulses synchronously from the same source with sufficient delay provided between them to prevent any coincidence. Another way is to provide an inhibit gate between first divider 51 and first counter 56, wherein operation of one inhibits operation of the other. Hence, the invention can be readily prevented from providing phase errors due to such coincidence.

It is realized from the above explanation that the pulse-division ratio of oscillator frequency to tone output frequency can be modified to any value by changing the number of binary divider components in divider 50. It is also realized that the computer can be altered to block a greater or lesser number of pulses at the input to the divider, as required by a given type of phase-pulse modulation. Thus, the phase requirements of any type of plural-channel system can be provided.

For example, a dual-channel system having between adjacent pulses the four phase conditions of 0°, 90°, 180° and 270°, requires only a pulse-division ratio of four and also requires only a single counter with a matrix that provides output level $a$ for one and two pulses, respectively. This type of pulse modulator is obviously simpler than that described; but at the present state of the art, it requires a more complex detection means (not part of his invention) than required for the system of the illustrated modulators which provide for adjacent tone pulses the four phase conditions of 45°, 135°, 225° and 315°.

A further example shows how the invention can satisfy a three channel system, wherein eight possible phase conditions are provided between adjacent pulses, which may be 0°, 45°, 90°, 135°, 180°, 225°, 270°, and 315°. In this case, the pulse-divider divides the oscillator frequency by a minimum of eight, with the first binary divider being by-passable in the same manner as in the illustrated embodiments. The counter need then only count up to four, and the matrix need maintain a blocked condition to the divider input for a maximum of four pulses.

Although this invention has been described with respect to particular embodiments thereof, it is not to be so limited as changes and modifications may be made therein which are within the full intended scope of the invention as defined by the appended claims.

I claim:

1. Means for incrementally advancing the sequence of an output pulsed wave, comprising means for generating pulses, plural-stage repetition-rate division means for dividing the repetition rate of said generated pulses to a given submultiple value to provide said output pulsed wave, and means for bypassing at least one of said stages before the last stage in said plural stage division means with selected ones of said generated pulses, whereby said output wave occurring after said by-passing is advanced with respect to the output wave before said by-passing by one increment for each pulse by-passed.

2. Phase-pulse generating means comprising means for providing electrical oscillation, a pulse-forming circuit connected to the output of said oscillation means, a divider gate that is normally open, and that has a control input, and a counter gate that is normally closed and that has a control input, each of said gates having its controlled input connected to the output of said pulse-forming circuit, a pulse-rate divider connected to the output of said divider gate, a filter connected to the output of said divider for passing the fundamental frequency component of said divider output, a pulse counter having its input connected to the output of said counter gate, computing means connected with said counter means, means connecting the output of said computing means to the control inputs of said gates, and said computing means periodically providing an output signal that periodically blocks computed numbers of pulses to the input of said divider to cause periodically selected phase shifts of said fundamental frequency component.

3. Phase-pulse generating means comprising a source of oscillation, pulse-forming means connected to the output of said oscillation source, a divider gate, and a counter gate, each having its controlled input connected to the output of said pulse-forming means, a plurality of pulse dividers connected in tandem, with the first of said dividers being connected to the output of said divider gate, filtering means connected to the output of the last divider to select one of its frequency components, a by-pass gate, means connecting said by-pass gate between the output of said counter gate and the input to any of said dividers except the first, means for closing said divider gate to block a selected number of pulses from the input to said first pulse divider, and means for opening said counter gate to pass said pulses blocked by said divider gate, and means for sequentially opening and closing said by-pass gate to provide respective leading and lagging phase shifts of said selected frequency component proportional to the number of pulses blocked by said divider gate.

4. Generator means as defined in claim 3 wherein said plurality of pulse dividers divides the pulse-repetition rate of the output of said divider gate by eight, whereby the phase shift of the fundamental output frequency of said divider output is 45 degrees for each pulse blocked or by-passed.

5. A phase-pulse generator for phase shifting a tone output frequency incrementally in response to a binary data input, comprising a source of oscillation, a pulse-forming circuit connected to the output of said oscillation source to provide at least one pulse for each cycle from said oscillation source, a divider gate, and a counter gate, each having a control input, and each having its controlled input connected to the output of said pulse-forming circuit, three bistable circuits connected in tandem, with the input to the first bistable circuit being connected to the output of said divider gate, a by-pass gate being connected between the input to the second of said bistable circuits and to the output of said counter gate, filter means connected to the ouput of said third bistable circuit to pass its fundamental frequency component which is said tone output frequency, a pulse counter being connected to the output of said counter gate, timing means for resetting said counter at the initiation of pulses of said data input, computing means for receiving said data input and said pulse counter output, means connecting the output of said computing means to the control inputs of said divider gate and said counter gate, said computing means determining when a given pulse count is reached by said counter, said pulse count being determined by the amplitudes of said data input, said resetting means actuating said counter and computing means to close said divider gate and open said counter gate and to initiate a pulse count by said computing means, with said computing means output opening said divider gate and closing said counter gate when said computing means counts said given number of pulses.

6. A phase-pulse generator as defined in claim 5 including plural binary data inputs synchronous with said timing means, and means connecting said data inputs to the control inputs of said by-pass gate and said computing means.

7. A phase-pulse generator for translating plural binary data inputs, comprising a source of electrical oscillation, means providing at least one pulse for each cycle of said oscillation, a divider gate, and a counter gate, each having its controlled input connected to said pulse means, three bistable circuits, with the first having its input connected to the output of said divider gate, an "or" gate having one input connected to the output of said first bistable circuit and having its output connected to the input of said second bistable circuit, said third bistable circuit having its input connected to the output of said second bistable circuit, and a filter connected to the output of said third bistable circuit to pass its fundamental frequency component; a by-pass gate connected between the output of said counter gate and the other input to said "or" gate, a first binary data channel connected to the control input of said by-pass gate to open and close it in response to the opposite binary states of said data input, a second data channel, and a source of timing pulses synchronous with the binary variation of both of said channels, a pulse counter having its input connected to the output of said counter gate, means for resetting said counter to a given output state in response to each of said timing pulses, matrix-computer means having inputs connected to said second data channel and said counter output, means connecting the output of said matrix-computer means to the control inputs of said divider gate and said counter gate to maintain said divider gate normally open and said counter gate normally closed, and said matrix-computer means output being inverted from normal by the resetting cycle of each of said timing pulses to open said counter gate and close said divider gate, with said matrix-computer means output providing said inverted output state for one given number of counted pulses for one binary state of said second data channel and for another given number of counted pulses for the opposite binary state of said second channel.

8. A generator as in claim 7 in which said matrix-computer means output is reversed from normal for a period of one pulse for one binary state of said second data-channel input and for three pulses for the other binary state of said second-channel input.

9. A generator as defined in claim 7 in which said matrix-computer means inverts its output for two pulses following each timing pulse when said second data channel is disconnected.

10. A generator as defined in claim 7 in which said counter comprises first, and second bistable circuits connected in tandem; and said matrix-computer means includes, an "or" circuit, means connecting one input of said "or" circuit to the input from said second data channel, and the other input of said "or" circuit being connected to the output of said second counter bistable circuit, an "and" circuit, means connecting one input of said "and" circuit to the output of said first counter bistable circuit, said "and" circuit having its other input connected to the output of said "or" circuit, and said "and"

circuit providing the output of said matrix-computer means.

11. A generator as defined in claim 7 in which said counter comprises first, and second bistable circuits connected in tandem; and said matrix-computer means includes, a first "or" circuit, a second "or" circuit having one input connected to one input of said first "or" circuit, the second input of said second "or" circuit being connected to the output of said second counter circuit, a third "or" circuit having one input connected to the output of said first counter circuit, a voltage inverter connected between the output of said first "or" circuit and the other input of said third "or" circuit, an "and" circuit having one input connected to the output of said second "or" circuit and having another input connected to the output of said third "or" circuit, and the output of said "and" circuit being the output of said matrix-computer means.

12. A generator as defined in claim 7 in which said counter comprises at least one bistable circuit, and said matrix-computer means comprises, an "and" circuit, means providing a constant actuating voltage to one input of said "and" circuit, and means connecting the output of said bistable counter circuit to the other input of said "and" circuit, whereby said matrix-computer output is inverted for two blocked pulses following each timing pulse.

13. A generator as defined in claim 7 in which said counter comprises first, and second bistable circuits, and means connecting the output of said second counter to the output of said matrix-computer circuit, whereby said matrix-computer output is inverted for two blocked pulses following each timing pulse.

14. Phase-pulse generating means comprising a divider gate having a pair of inputs, and a counter gate having a pair of inputs, pulse-forming means having its output connected to one input of each of said gates, filtering means, a divider "or" gate, a first binary pulse-repetition-rate divider connected between the output of said divider gate and one input to said divider "or" gate, a pair of binary pulse-repetition-rate dividers connected in tandem between the output of said divider "or" gate and the input to said filter means, a by-pass gate connected between the output of said counter gate and the other input to said divider "or" gate, a first binary-data channel connected to the control input of said by-pass gate, wherein one data state opens and the other data state closes said by-pass gate, a second binary-data channel, and a source of timing pulses synchronous with the leading edges of the binary-data pulses of said first and second channels, a counter comprising first, and second bistable circuits connected in tandem, with said counter input being connected to the output of said counter gate, reset means included in said counter and connected to said timing pulse source, wherein said counter is reset by each timing pulse; a matrix computer, means connecting the output of said matrix computer to the control inputs of said divider gate and counter gate to normally maintain said divider gate open and said counter gate closed, said matrix computer comprsing, an "or" circuit having one input connected to said second data channel and its other input connected to the output of said counter's second bistable circuit, an "and" circuit having one input connected to the output of said "or" circuit, and means connecting the output of said counter's first bistable circuit to the other input of said "and" circuit, with the output of said "and" circuit being the output of said matrix computer.

15. Phase-pulse generating means comprising pulse-forming means, a divider gate, and a counter gate, each having its input connected to said pulse-forming means, filtering means, a divider "or" gate, a first binary pulse-repetition-rate divider connected between the output of said divider gate and one input to said divider "or" gate, second and third binary pulse-repetition-rate dividers connected in tandem between the output of said divider "or" gate and the input to said filter means, a by-pass gate connected between the output of said counter gate and the other input to said divider "or" gate, a counter comprising first and second bistable circuits connected in tandem, with said counter input being connected to the output of said counter gate, reset means being provided with both said counter bistable circuits, a matrix circuit comprising a pair of data input terminals, a first "or" gate having its inputs connected to said input terminals, inverter means having its input connected to the output of said first "or" circuit, a second "or" circuit having one input connected to one of said input terminals, and its other input conmnected to the output of said counter's second bistable circuit, a third "or" circuit having one input connected to the output of the counter's first bistable circuit and having its other input connected to the output of said inverter means, said inverter means providing an inhibiting input to said third "or" circuit only when it does not receive any input from said first "or" circuit, and an "and" circuit having one input connected to the output of said second "or" circuit and having its other input connected to the output of said third "or" circuit.

16. Means for incrementally phase modulating an output frequency, comprising a pulse-forming circuit, a chain of binary pulse-repetition-rate dividers, pulse-diverting means normally connecting the output of said pulse-forming circuit to the input of the first of said dividers, a low-pass filter connected to the last divider to provide said output frequency, a counter circuit comprising at least one bistable circuit, said pulse-diverting means having its output alternately connectable to said first divider and the input to said counter, a source of timing pulses, reset means included within said counter connected to said timing pulse source; matrix means, means connecting the output of said matrix means to said pulse-diverting means, said diverting means being diverted from its normal state by said matrix means by each resetting of said counter by a timing pulse, and input data controlling the period of diversion from normal by said pulse diverting means.

17. Incremental phase-modulating means as defined in claim 16 in which a divider "or" circuit has an input and its output connected serially between two dividers in said chain, by-pass gate means connected between the input to said counter and the other input to said divider "or" circuit; said matrix circuit, comprising an "and" gate with its output being the output of said matrix circuit, means connecting the output of said counter circuit to one input of said "and" circuit, and means connecting the second input of said "and" circuit to maintain it at an actuating level, whereby the output frequency also is phase shifted by diverting pulses from said pulse-forming means around a portion of said divider chain.

18. Phase-pulse generator means comprising an oscillator, pulse-forming means connected to said oscillator, a divider gate, and a counter gate, each having its input connected to said pulse-forming means, a divider "or" gate, a first binary pulse rate divider circuit connected between said divider gate and one input to said divider "or" circuit, a by-pass gate connected between the output of said counter gate and the other input to said divider "or" circuit, means for dividing a pulse rate by four being connected to the output of said divider "or" circuit, and filter means connected to the output of said divide-by-four means to pass its fundamental output frequency component; a counter circuit comprising two binary counters connected in tandem, with the first binary counter being connected to the output of said counter gate, counter reset means common to both of said binary counter circuits; a matrix circuit including a first "or" gate having a pair of inputs, a second "or" gate having one input in common with said first "or" gate, said second "or" gate having its other input connected to the output of said second binary counter, a third "or" circuit having one input connected to the output of said first binary counter, a voltage inverter circuit connected between the output of said first "or" circuit and the other input to said third "or" circuit, an "and" circuit having one input connected to the output of said second "or" circuit and its other input connected to the output of said third "or" circuit, the output of said "and" circuit being the output of said matrix and being connected to the control input of said divider gate circuit, and a voltage inverter circuit connected between the output of said "and" circuit and the control input of said counter gate circuit.

19. Plural-channel phase-pulse generating means, wherein the number of phases between adjacent phase pulses is two times the number of channels, comprising pulse-forming means, a normally-open divider gate having its signal input connected to said pulse-forming means, pulse-repetition-rate dividing means connected to the output of said divider gate, filtering means connected to the output of said dividing means to provide the frequency of said phase pulses, control means for closing said divider gate upon the initiation of each phase pulse, and computing means for controlling the closed period of said divider gate in proportion to the number of pulses blocked by it, and said closed period computed by said computing means for a different number of blocked pulses for each of the different respective phases provided between adjacent phase pulses.

20. Plural-channel phase-pulse generating means, wherein the data of said channels is translated into any one of a number of phases between adjacent phase-pulses, comprising pulse-forming means providing pulses having a substantially constant-repetition rate, a normally-open divider gate having its input connected to said pulse-forming means, pulse-repetition-rate dividing means connected to the output of said divider gate, said dividing means comprising a plurality of binary dividers connected in tandem, said dividing means having a division ratio equal to at least to $2^n$ with $n$ being the number of said channels, filtering means connected to the output of said dividing means to provide the frequency of said phase-pulses, means for closing said divider gate upon the initiation of each phase-pulse, and computing means for controlling the closed period of said divider gate in proportion to the number of pulses blocked by it, the number of blocked pulses being a different number for each type of phase-pulse with said number being an integer up to twice the number of channels.

21. Plural-channel generating means as defined in claim 20, comprising means for by-passing said blocked pulses around the first portion of said dividing means, said by-passing means opened for one-half of said number of phase-pulses and closed for the other half, and the number of blocked pulses per type of phase-pulse varying up to an integer multiple of the number of channels.

22. A phase-pulse generating means as defined in claim 21 in which two channels comprise said plural channels, and four phases are provided between adjacent phase-pulses, said phases being 45°, 135°, 225° and 315°.

23. A controlled phase-shift generating means, comprising a frequency source, pulse-forming means connected to said frequency source for forming pulses synchronous with the source frequency, a normally-open gate connected to the output of said pulse-forming means, pulse-repetition-rate dividing means connected to the output of said gate, filtering means connected to the output of said dividing means to pass the fundamental frequency component of the output of said dividing means, and control means for closing said gate to block a selected number of pulses to said dividing means input, said dividing means including plural component division stages, normally-closed gate means for bypassing at least one stage in said dividing means, and said normally-closed gate means being opened by said control means when it closes said normally-open gate means, whereby the output of said filter is phase shifted incrementally in a lagging or leading direction proportional to the number of by-passed or blocked pulses.

24. Means for incrementally phase-shifting an output pulsed wave in response to bits of input binary data, comprising pulse-generating means, plural-stage repetition-rate division means for dividing the repetition rate of said generated pulses to a given submultiple value to provide said output pulsed wave, matrix means for providing a predetermined number of additional input pulses in response to respective bits of said input data, means for inserting said additional input into at least one of the stages in said plural-stage division means between normally received pulses derived from said generating means, whereby said output wave is modulated by discrete phase shifts by said input data.

25. Means for incrementally phase-shifting an output pulsed wave in response to bits of binary data, comprising pulse-generating means, $n$ number of binary dividers connected in tandem to said generating means and providing an output pulse rate of $1/2^n$ of the rate of said generated pulses, normal pulses derived from said generating means being received at the input of each of said binary dividers, matrix means for providing an output comprising a predetermined number of additional input pulses in response to respective bits of said input data, means for inserting the output of said matrix means between the normal pulses at the input to any of said binary dividers, with the output pulsed wave being advanced by a phase-shift that is an integer multiple of $$\frac{360°}{2^n}$$

26. Means for incrementally phase-shifting an output wave in response to bits of binary data, comprising pulse-generating means, three binary dividers connected in tandem to said pulse-generating means for dividing the pulse-repetition rate of said generating means by eight, filtering means connected to said dividers to pass said output wave, matrix means for providing an output comprising a predetermined number of additional input pulses in response to respective bits of said input data, means for connecting the output of said matrix to an input to said second divider to provide the additional input pulses between normally received pulses derived from said generating means, with said additional pulses providing a phase shift of the output wave by an integer multiple of 45°.

References Cited in the file of this patent

UNITED STATES PATENTS

| 2,466,044 | Schoenfeld | Apr. 5, 1949 |
| 2,824,961 | Paivinen | Feb. 25, 1958 |
| 2,825,805 | Ziffer | Mar. 4, 1958 |

FOREIGN PATENTS

| 143,011 | Australia | Aug. 21, 1951 |